United States Patent
Kirby

(10) Patent No.: US 7,287,352 B1
(45) Date of Patent: Oct. 30, 2007

(54) DECOY WITH MOVABLE HEAD AND/OR TAIL PORTIONS

(76) Inventor: Richard C. Kirby, 6426 W Quaker Rd., Orchard Park, NY (US) 14127

( * ) Notice: Subject to any disclaimer, the term of this patent is extended or adjusted under 35 U.S.C. 154(b) by 0 days.

(21) Appl. No.: 10/948,119

(22) Filed: Sep. 23, 2004

(51) Int. Cl.
A01M 31/06 (2006.01)
(52) U.S. Cl. ............................................. 43/2
(58) Field of Classification Search ............... 43/2, 43/3
See application file for complete search history.

(56) References Cited

U.S. PATENT DOCUMENTS

| | | | | |
|---|---|---|---|---|
| 740,293 | A * | 9/1903 | Loeble | 43/3 |
| 843,588 | A * | 2/1907 | Ditto | 43/3 |
| 1,831,286 | A * | 11/1931 | Chelini | 43/3 |
| 2,256,778 | A * | 9/1941 | Lundgren | 43/3 |
| 2,457,295 | A * | 12/1948 | Woodhead | 43/3 |
| 2,480,390 | A * | 8/1949 | Thompson | 43/3 |
| 2,536,736 | A * | 1/1951 | Gazalski | 43/3 |
| 2,663,108 | A * | 12/1953 | Dixon et al. | 43/3 |
| 2,691,233 | A * | 10/1954 | Richardson | 43/3 |
| 2,752,715 | A * | 7/1956 | Miller | 43/3 |
| 2,787,074 | A * | 4/1957 | Miller | 43/3 |
| 2,793,456 | A * | 5/1957 | Argo | 43/3 |
| 2,849,823 | A * | 9/1958 | Miller | 43/3 |
| 2,953,869 | A * | 9/1960 | Collischan | 43/2 |
| 3,059,368 | A * | 10/1962 | Wortman | 43/3 |
| 3,350,808 | A * | 11/1967 | Mitchell | 43/3 |
| 3,916,553 | A * | 11/1975 | Lynch et al. | 43/3 |
| 3,927,485 | A * | 12/1975 | Thorsnes, Jr. | 43/3 |
| 4,251,937 | A * | 2/1981 | Curley | 43/3 |
| 4,611,421 | A * | 9/1986 | Jacob | 43/3 |
| 4,651,457 | A * | 3/1987 | Nelson et al. | 43/3 |
| 4,845,873 | A | 7/1989 | Hazlett | |
| 4,885,861 | A * | 12/1989 | Gazalski | 43/3 |
| 4,965,953 | A * | 10/1990 | McKinney | 43/2 |
| 5,036,614 | A * | 8/1991 | Jackson | 43/3 |
| 5,168,649 | A * | 12/1992 | Wright | 43/2 |
| 5,233,780 | A * | 8/1993 | Overholt | 43/2 |
| 5,274,942 | A * | 1/1994 | Lanius | 43/2 |
| 5,289,654 | A * | 3/1994 | Denny et al. | 43/2 |
| 5,335,438 | A * | 8/1994 | Terrill | 43/2 |
| 5,459,958 | A * | 10/1995 | Reinke | 43/2 |
| 5,515,637 | A * | 5/1996 | Johnson | 43/2 |
| 5,636,466 | A * | 6/1997 | Davis | 43/3 |
| 5,791,081 | A * | 8/1998 | Turner et al. | 43/2 |
| 5,884,427 | A | 3/1999 | Lenz | |
| 5,926,990 | A * | 7/1999 | Okimoto | 43/2 |
| 6,021,594 | A * | 2/2000 | Krueger | 43/2 |
| 6,070,356 | A * | 6/2000 | Brint et al. | 43/2 |
| 6,092,322 | A * | 7/2000 | Samaras | 43/2 |

(Continued)

FOREIGN PATENT DOCUMENTS

EP 1179296 A2 * 2/2002

(Continued)

Primary Examiner—Darren W. Ark
(74) Attorney, Agent, or Firm—James C. Simmons

(57) ABSTRACT

A decoy for use during hunting. Two decoy portions overlap and together depict a turkey or other animal. A member is attached to a stand and is pivotally connected to at least one of the portions in a manner to effect movement of the one portion relative to the other portion between different positions such as an upright position and a feeding position for a turkey.

20 Claims, 5 Drawing Sheets

U.S. PATENT DOCUMENTS

| | | | |
|---|---|---|---|
| 6,216,382 B1 * | 4/2001 | Lindaman | 43/2 |
| 6,408,558 B1 * | 6/2002 | Cornell et al. | 43/2 |
| 6,481,147 B2 * | 11/2002 | Lindaman | 43/2 |
| 6,484,431 B2 * | 11/2002 | Price et al. | 43/3 |
| 6,487,810 B1 * | 12/2002 | Loughman | 43/2 |
| 6,532,693 B2 * | 3/2003 | Sides | 43/2 |
| 6,553,709 B1 * | 4/2003 | Owen | 43/3 |
| 6,560,912 B1 * | 5/2003 | Achepohl | 43/3 |
| 6,574,902 B1 * | 6/2003 | Conger | 43/2 |
| 6,591,539 B2 * | 7/2003 | Cosciani | 43/2 |
| 6,643,971 B2 * | 11/2003 | Daniels | 43/3 |
| 6,684,552 B1 * | 2/2004 | Anders, III | 43/3 |
| 6,708,440 B2 * | 3/2004 | Summers et al. | 43/2 |
| 6,775,943 B2 * | 8/2004 | Loughman | 43/2 |
| 6,901,693 B1 * | 6/2005 | Crowe | 43/2 |
| 2002/0162268 A1 * | 11/2002 | Fulcher | 43/3 |
| 2004/0031185 A1 | 2/2004 | Summers et al. | |
| 2004/0250461 A1 * | 12/2004 | Dryer | 43/2 |
| 2005/0204604 A1 * | 9/2005 | Noles et al. | 43/2 |
| 2006/0053675 A1 * | 3/2006 | Lindaman | 43/2 |
| 2007/0062093 A1 * | 3/2007 | Hess | 43/2 |

FOREIGN PATENT DOCUMENTS

| | | | |
|---|---|---|---|
| EP | 1279333 A2 * | 1/2003 | |
| GB | 2189124 A * | 10/1987 | |
| GB | 2230171 A * | 10/1990 | |
| GB | 2295953 A * | 6/1996 | |
| GB | 2412560 A * | 10/2005 | |
| WO | WO-03/059058 A1 * | 7/2003 | |

* cited by examiner

DECOY WITH MOVABLE HEAD AND/OR TAIL PORTIONS

The present invention relates generally to decoys such as used by hunters for hunting turkeys and other wild game such as deer, elk, and antelope. More particularly, the present invention relates to decoys with movable parts such as, for example, feeding turkeys having movable heads and strutting turkeys having movable tails. Hunters typically use decoys in combination with calls, and movable part decoys are more realistic and thus lessen the chances of a turkey becoming suspicious and running away.

U.S. Pat. No. 4,965,953 to McKinney discloses a remote controlled (by means of a pull line) turkey decoy which includes a support stand to which the main body member is pivoted. The head and neck member is in turn pivotally connected to the main body member. By pulling on the pull member, the entire bird decoy is caused to pivot downwardly first to the limit of its pivotal movement followed by the pivoting downwardly of the head and neck member to simulate a bird feeding. The arrangement for such a pivoting movement is undesirably unduly complex and may be flimsy and less reliable than desired. Remote control (electronically) of decoy head movement is shown, for example, in U.S. Pat. Nos. 6,684,552 and 5,289,654. Examples of other structures for effecting decoy head or tail movement are found in U.S. Pat. Nos. 2,953,869; 4,845,873; 5,274,942; and 5,884,427, and in U.S. patent application publications 2002/0162268 and 2004/0031185. The above patents/published applications are incorporated herein by reference.

It is an object of the present invention to provide a rugged, sturdy, and reliable yet realistically-looking movable head and/or tail turkey or other animal decoy.

In order to achieve the above object, in accordance with the present invention, a decoy is provided wherein two decoy portions together depict an animal and one overlaps the other, and a member is pivotally attached to a stand and connected to at least one of the portions in a manner to effect movement thereof relative to the other portion.

The above and other objects, features, and advantages of the present invention may be found in the following detailed description of the preferred embodiment thereof when read in conjunction with the accompanying drawings wherein the same reference numerals denote the same or similar parts throughout the several views.

DETAILED DESCRIPTION OF THE PREFERRED EMBODIMENT

Figure 1:
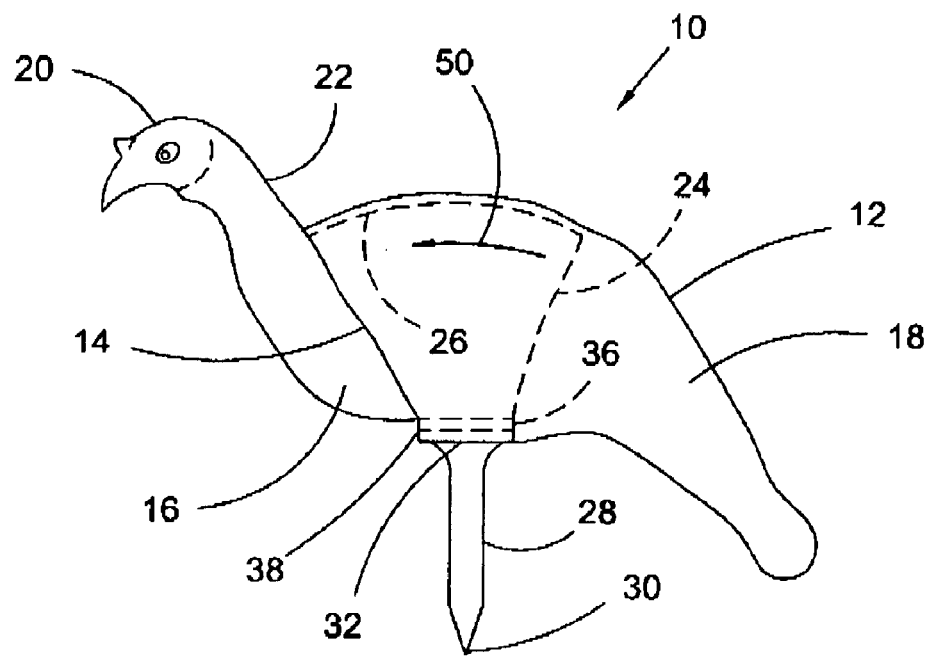
FIG. 1 is a diagrammatic view of a turkey decoy, which embodies the present invention, in an upright position.

Referring to FIGS. 1 to 4, there is shown generally at 10 a feeding hen turkey decoy, i.e., a structure formed to provide the appearance of a feeding hen turkey. The decoy is illustrated movable between an upright position in FIGS. 1 and 3 and a drop feeding position in FIGS. 2 and 4. This is intended to give the decoy a more realistic appearance for attracting turkeys for hunting thereof. It should be understood that the decoy of the present invention may be formed to depict other animals, such as other fowl, deer, elk, and antelope.

The decoy 10 includes a first or tail portion 12 which is suitably shaped and decorated to depict the tail and the major portion of the body 18 of a turkey, the forward edge of first portion 12 being at 14. A second or head portion 16 of the decoy 10 is suitably shaped and decorated to depict the head 20, neck 22, and a portion of the body 18 of the turkey. The rear edge of the second portion 16 is at 24, and an upper edge 26 thereof extends between the rear edge 24 and the neck portion 22.

Figure 2:
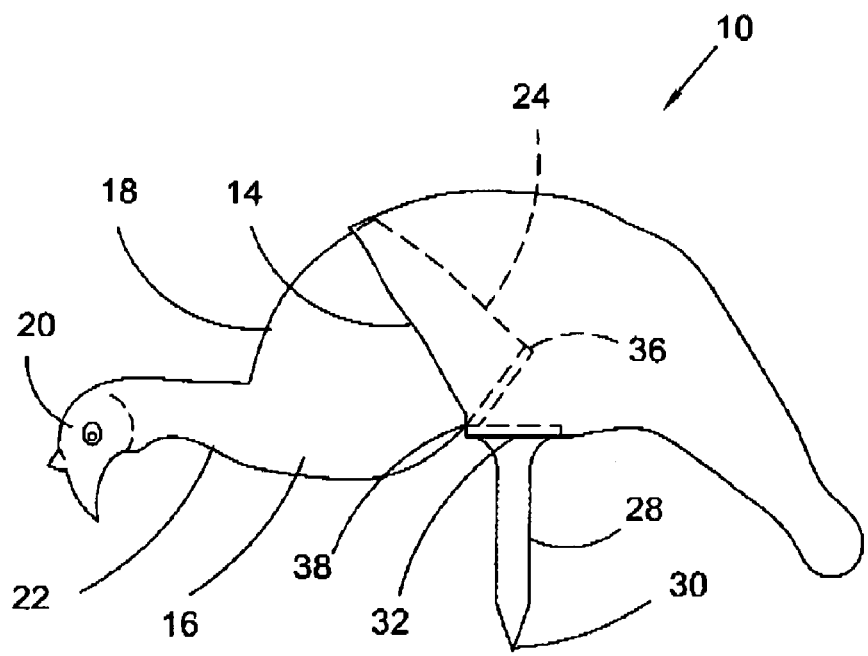
FIG. 2 is a view similar to that of FIG. 1 of the decoy in a drop feeding position.
Figure 3:
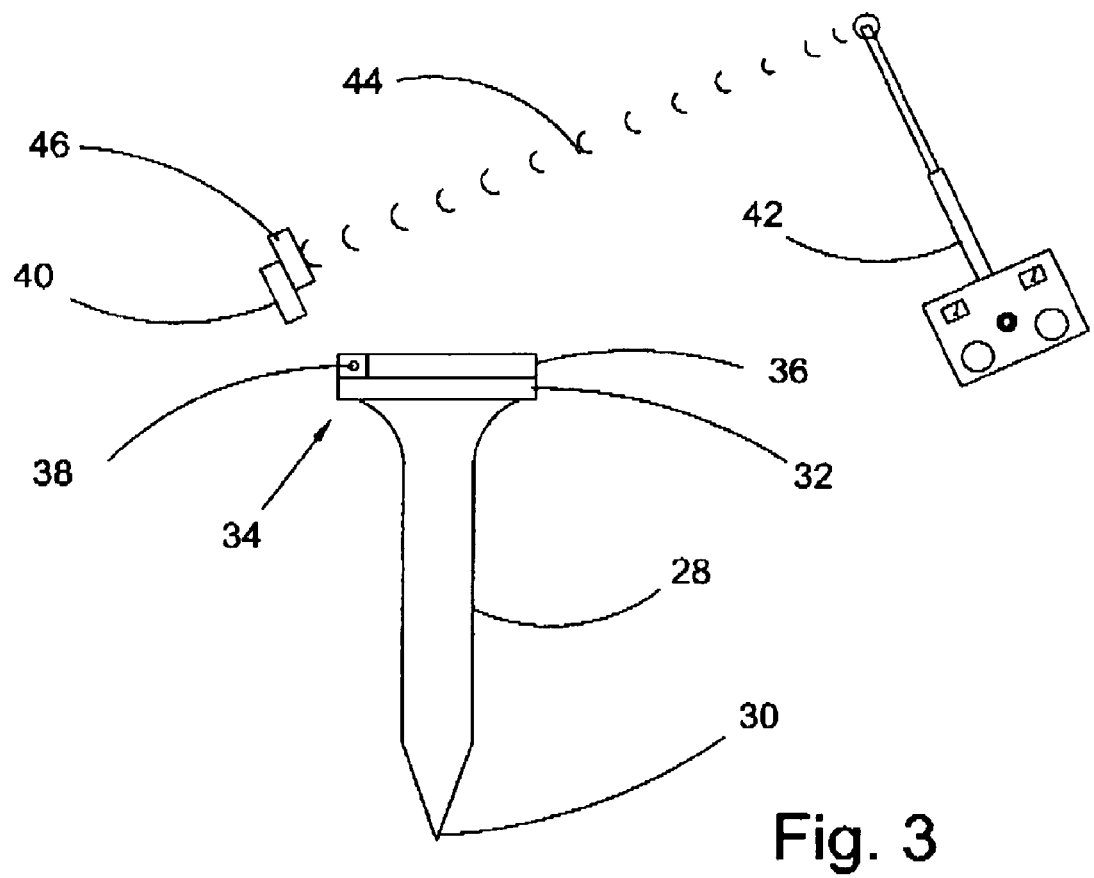
FIG. 3 is a view similar to that of FIG. 1 of a hinge for the decoy in a closed position for providing the upright decoy position.
Figure 4:
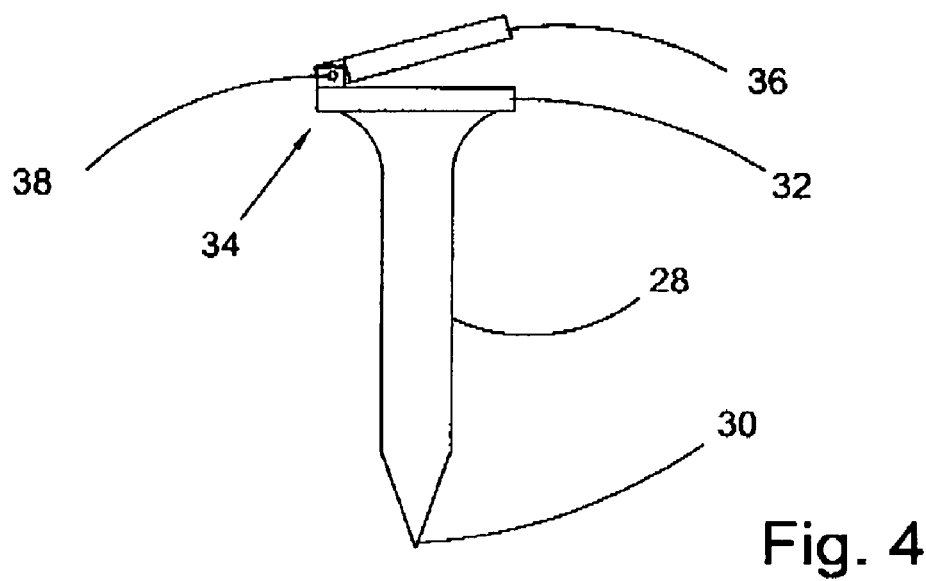
FIG. 4 is a view similar to that of FIG. 1 of the hinge in an open position for providing the drop feeding decoy position.

As illustrated in FIGS. 1 and 2, the portions 12 and 16 overlap. Thus, the portions 12 and 16 are composed of a thin material leaving a generally hollow interior. The thin material may be stiff or collapsible (or somewhere inbetween), whereby either portion may be partially received within the other portion to thus overlap the other portion. If the portions 12 and 16 are made of collapsible material, then stiffening wires may desirably be suitably positioned therein to guard against such collapse. As seen in FIGS. 1 and 2, the second portion 16 overlaps the first portion 12, a part of the second portion 16 being received within the hollow interior of the first portion 12 for movement relative thereto. It should however be understood that, alternatively, a part of the second portion 16 may overlap and lie exteriorly of the first portion 12.

In accordance with the present invention, the second portion 16 is pivotable about pin 38 for movement thereof relative to the first portion 12, as seen best in FIG. 1 and as illustrated at 50 for movement of edge 24 to the position illustrated in FIG. 2. It should however be understood that the first portion 12 may be pivotable for movement thereof within the second portion 16.

The decoy 10 is received on a stake or stand 28 which may have a sharp lower point 30 so that it may be driven into the ground to locate the decoy at a desired location. A first member 32 of a hinge 34 is suitably attached to the upper end of the stand 28 and to the decoy portion 12 (at a lower part thereof) so that the decoy portion 12 remains stationary as the decoy second portion 16 is pivotally moved. The first member 32 may alternatively be an integral part of the stand 28 or of the decoy portion 12, wherein the stand or decoy portion is formed to provide an aperture for pin 38. For another alternative embodiment, the decoy portion 12, stand 28, and first hinge member 32 may be a single piece, with the single piece formed to provide an aperture for hinge pin 38. A second member 36 of the hinge 34 is suitably connected to a lower part of the second decoy portion 16 and is hingedly connected to the stand 28. More specifically, the second hinge member 36 is connected to the first hinge member 32 (which is integral with the stand 28 or part of a stand assembly) as by the hinge pin 38 (received conventionally in apertures in both hinge members 32 and 36) for the aforesaid movement pivotally of the second hinge member 36 between the closed position illustrated in FIGS. 1 and 3 and the open position illustrated in FIGS. 2 and 4 so that the turkey head 20 may move between the upright and feeding positions of FIGS. 1 and 2 respectively. The second member 36 may alternatively be an integral part of the decoy portion 16, formed to provide an aperture for hinge pin 38. Thus, in accordance with the present invention, the hinge 34 may be integral parts of the stand 28 and/or decoy portion 12 and the decoy portion 16 each having an aperture suitably formed therein for receiving the hinge pin 38. The attachment of the hinge 34 to the stand 28 allows the resulting decoy to be sturdy, rugged, and reliable.

The hinge 34 may be opened and closed remotely by suitable means (illustrated in FIG. 3 and understood to also be in the other figures) such as a motor, illustrated schematically at 40, operated electronically remotely by a suitable remote control transmitter, illustrated at 42, which transmits a signal, illustrated at 44, to a receiver, illustrated schematically at 46, which suitably controls the motor 40. Such a remote control means may be provided using principles commonly known to those of ordinary skill in the art to which the present invention pertains.

It should be understood that an animal decoy may be provided with other movable parts. For example, a turkey decoy may be provided with a movable tail portion or both a movable head portion and movable tail portion, as will be discussed hereinafter. Such other embodiments are meant to come within the scope of the present invention.

Referring to FIGS. 5 to 11, there is shown generally at 60 a decoy in accordance with an alternative embodiment of the present invention. The decoy 60 comprises a member 61 which is decorated to provide the appearance of a turkey and which is divided into two portions, i.e., a forward or head portion 62 thereof comprises the head 64, neck 66, and forward part 68 of the body 70, and a rear or tail portion 72 thereof comprising the tail 74 and the rear part 76 of the body 70. The rear edge of the forward portion 62 is illustrated at 78. It should of course be understood that a decoy member in accordance with the present invention may be constructed and decorated to appear as any other fowl or animal.

Figure 5:
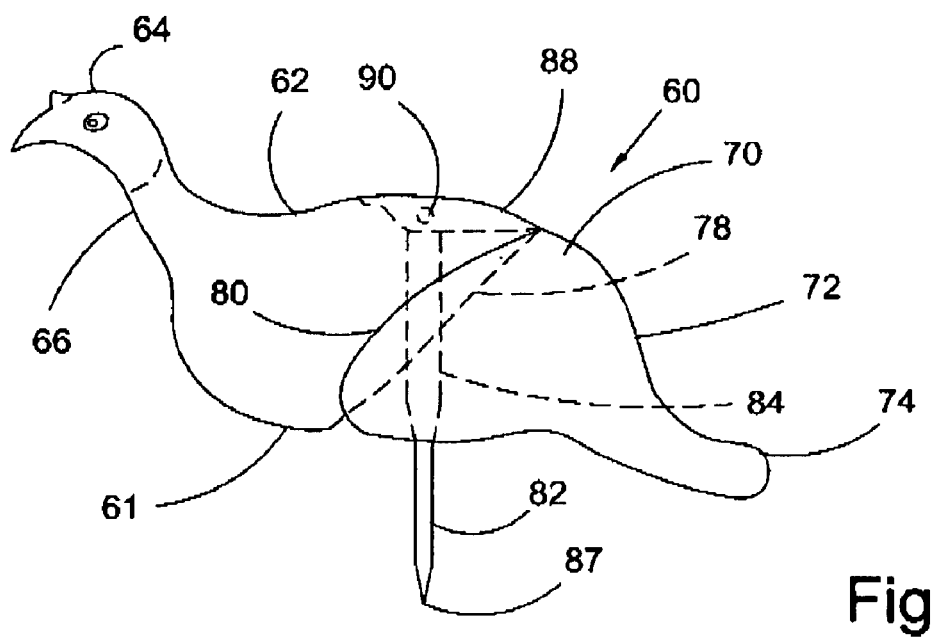
FIG. 5 is a view similar to that of FIG. 1 of a turkey decoy, in accordance with an alternative embodiment of the present invention, in an upright position.
Figure 6:
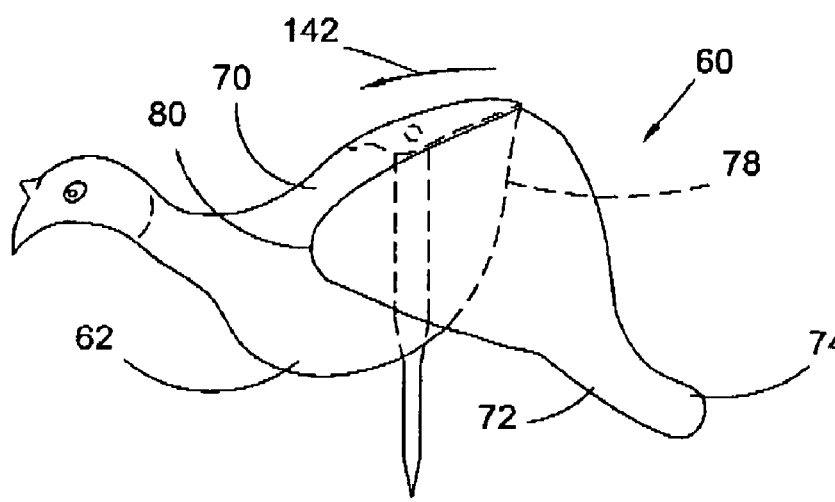
FIG. 6 is a view similar to that of FIG. 1 of the turkey decoy of FIG. 5 in a drop feeding position with its tail down.
Figure 7:
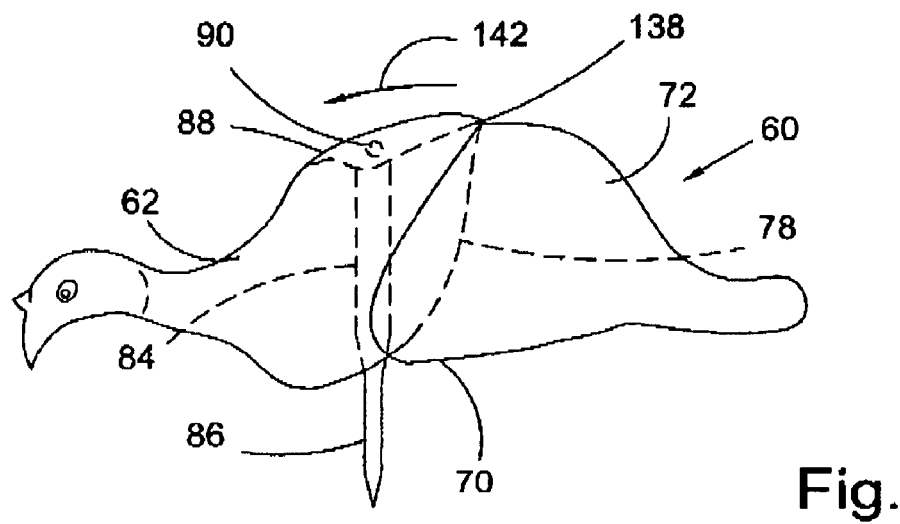
FIG. 7 is a view similar to that of FIG. 1 of the turkey decoy of FIG. 5 in a drop feeding position with its tail up.
Figure 8:
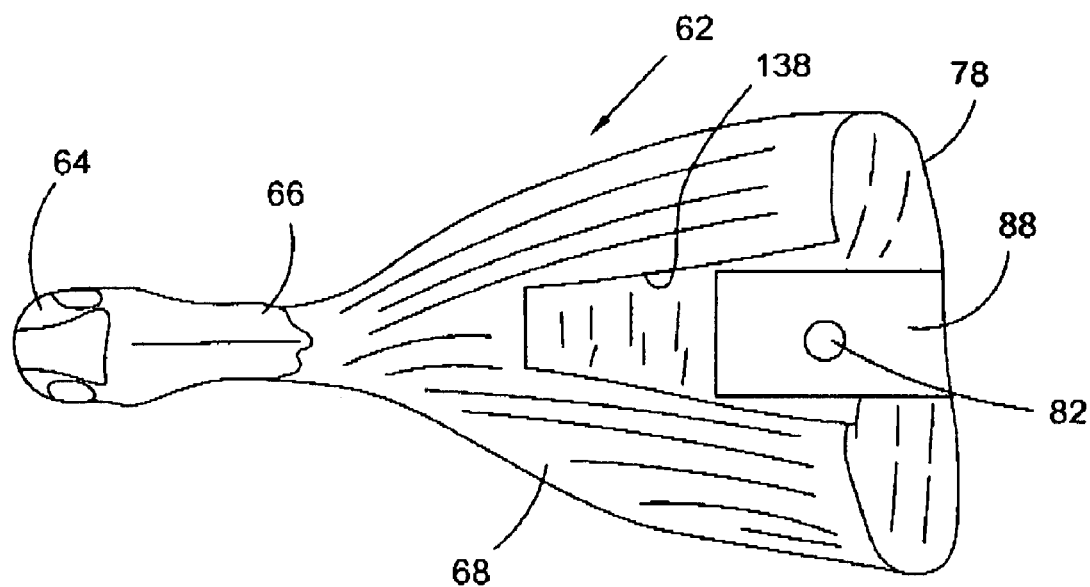
FIG. 8 is a bottom view of the head and neck portion of the decoy of FIG. 5.
Figure 9:
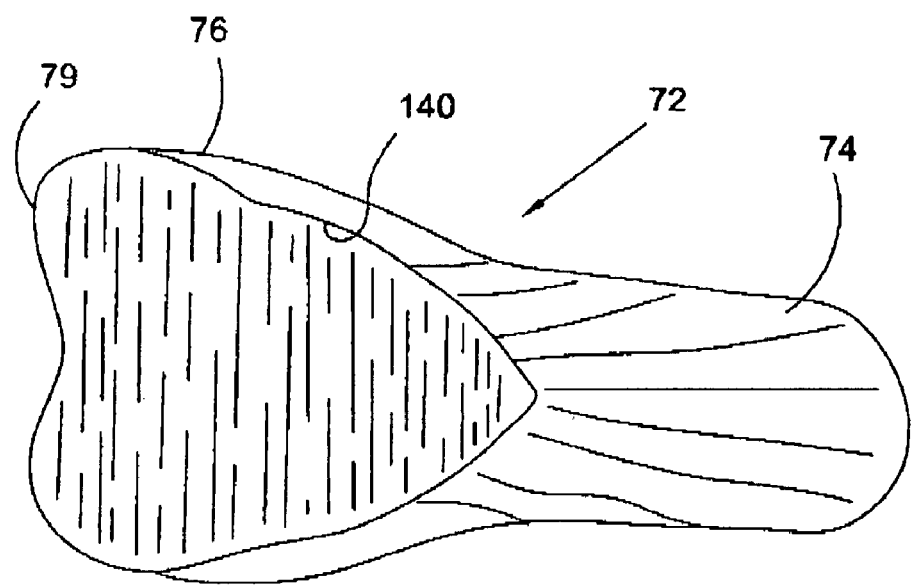
FIG. 9 is a view similar to that of FIG. 8 of the tail portion of the decoy of FIG. 5.

As seen in FIGS. 8 and 9, each of the decoy portions 62 and 72 is generally hollow. As seen in FIGS. 5 to 7, the decoy portions overlap, i.e., the rear edge 78 (and part of the forward portion 62 containing the rear edge 78) of the forward portion 62 is received within the hollow rear portion 72 and is movable therein relative to the rear portion 72 so that the amount of the forward portion 62 which overlaps the rear portion 72 varies. It should of course be understood that, alternatively, the forward edge 80 of the rear portion 72 may be receivable within the hollow forward portion 62.

A stand 82 has an upper portion 84 which is received in the hollow decoy member 61 and a lower portion 86 with a pointed lower end 87 which is planted in the ground. A pivot member 88 is suitably attached to the upper end of the stand 82 by a pin 90 or other suitable means so as to pivot in see-saw fashion about pin 90, as illustrated at 92 in FIG. 10. The pivot member 88 is suitable attached, as described hereinafter, to an upper part of the forward portion 62 adjacent the rear edge 78.

Figure 10:
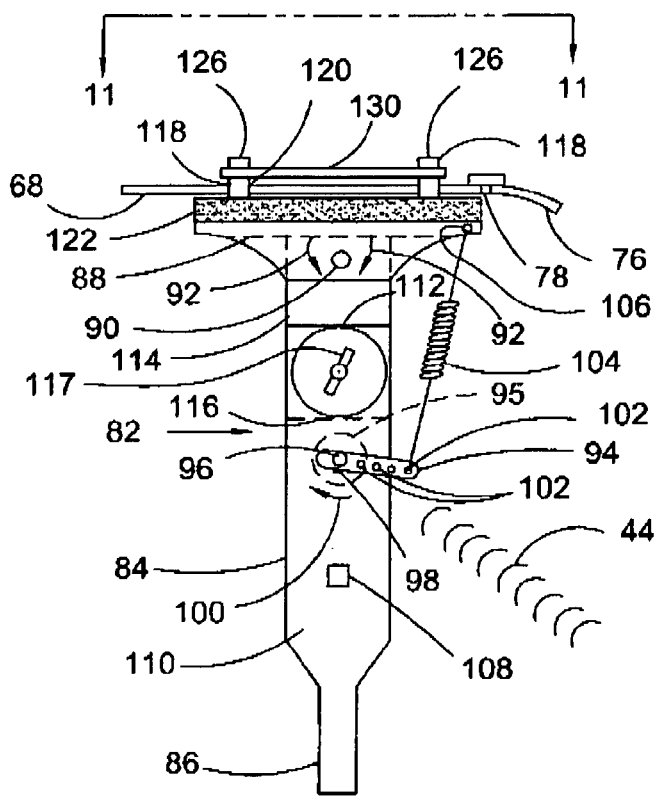
FIG. 10 is a side elevation view of a stand for the decoy of FIG. 5 and illustrating its attachment to the decoy.

Referring to FIG. 10, a motor, illustrated at 95, is contained within a hollow part of the stand 82, and a shaft 96 rotatable by the motor, as is commonly known, extends through a wall of the stand 82. One end portion of a lever 94 is suitably mounted on the shaft 96, for example by a set screw illustrated at 98, for rotation, as illustrated at 100, about the shaft 96 as effected by the motor in a manner which is commonly known. The motor is controlled remotely, such as by signal 44 from transmitter 42. However, it may also be controlled locally, such as by switch 108.

The lever 94 has a series of, for example, 4 spaced holes, illustrated at 102, spaced longitudinally thereof. A spring 104 extends between the lever 94 and a forward or aft edge portion of the pivot member 88 for translating the rotational movement of the lever 94 to see-saw movement of the pivot member 88. One end of the spring 104 is secured in one of the holes 102 (as shown, the outer hole), and the other end thereof is secured to a pin 106 in the pivot member 88. The additional holes 102 are provided to allow selection of an appropriate hole for securement of the spring 104 for adjustment of the degree of pivot of pivot member 88. In order to adjust the orientation of the pivot member 88 from generally horizontal, as illustrated in FIG. 10, to a slanting orientation, the stand 82 comprises a lower part 110 (which includes the lower portion 86 and a majority of the upper portion 84) the upper edge of which is illustrated at 112 and an upper part 114 the lower edge of which is illustrated at 116. The two parts 110 and 114 overlap, and a suitable fastener, illustrated at 117, connects the parts 110 and 114 to allow the part 114 to be adjustably skewed relative to part 110.

Figure 12:
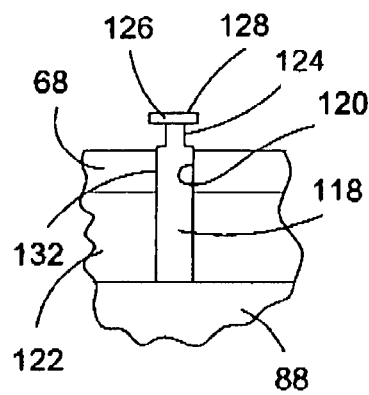
FIG. 12 is an enlarged partial view of the stand of FIG. 10 illustrating its attachment to a decoy portion.

In order to attach the pivot member 88 to the decoy portion 62, a pair of spaced columns 118 extend upwardly from the upper surface of the pivot member 88 and are received in apertures, illustrated at 120, formed in the decoy portion 68. A piece of soft foam material 122 is adhesively or otherwise suitably secured to the upper surface of the pivot member 88 and is interposed between the pivot member 88 and the decoy portion 68. Referring to FIG. 12, each column 118 has a reduced diameter upper end portion 124. A screw 126 having an enlarged head portion 128 is threadedly received in a threaded aperture (not shown) in the upper surface of the upper end portion 124. The diameter of the head portion 128 is greater than the diameter of the column portion 124 and approximately equal to the diameter of the lower portion 132 of the column 118. In order to secure the decoy portion 68 to the pivot member 88, an elastomeric band 130 is stretched about the column portions 124 so as to be held between the head portions 128 and the column lower portions 132. A stiffening wire (not shown) may, if desired, be looped about the columns 118 between the foam material 122 and the decoy portion 68, and the ends thereof extended into the head and neck region or as otherwise desired.

The stand 82 may, for example, be a Moto Magnet II Trumotion system for decoys marketed by Expedite International, Inc. of Hudson, Wis. (which has been provided to effect movement of an entire decoy, not one portion relative to another portion). Other suitable stands attached to a decoy portion in other suitable ways may be provided, and such other embodiments thereof are meant to come within the scope of the present invention.

Cut-outs 138 and 140 are suitably provided in the lower parts of the decoy portions 62 and 72 respectively to accommodate movements thereof relative to the stationary stand 82, i.e., prevent interference by the stand with movements of the decoy portions.

Figure 11:
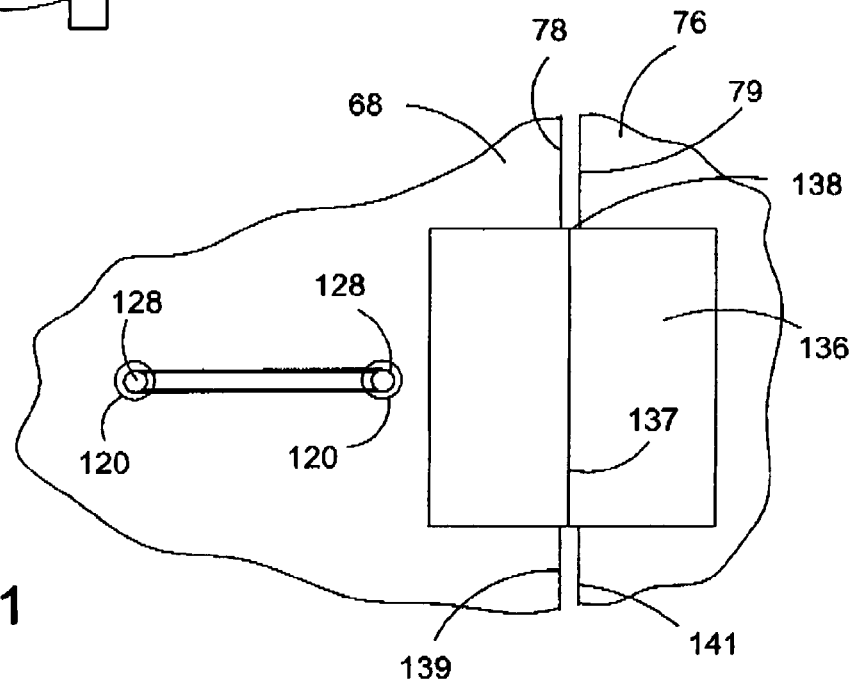
FIG. 11 is a partial view taken along lines 11-11 of FIG. 10 of the decoy of FIG. 5.

Referring to FIG. 11, in accordance with an aspect of the present invention, the upper facing edge portions 139 and 141 of edges 78 and 79 respectively (see also FIGS. 8 and 9) of decoy portions 68 and 76 respectively are attached by a piece of adhesive tape 136 or by other suitable means so that decoy portion 72 hangs therefrom, as seen in FIGS. 5 to 7, and so that the decoy portions 68 and 76 can pivot or move hingedly, as illustrated at 138, relative to each other, i.e., can move hingedly about an axis, illustrated at 137, which, as shown in FIG. 11, extends in a direction along or generally parallel to the upper edge portions 139 and 141 so that the head and tail portions are swingable relative to each other about the axis 137. The portions 68 and 76 may be hingedly attached over a distance of, for example, about 2 inches.

Referring to FIGS. 5 to 7, there is illustrated various stages of movement of the decoy 60. The decoy 60 is shown in FIG. 5 in a standing position, with the decoy portions 62 and 72 only slightly overlapping, i.e., the edge 78 is just a little inside the rear decoy portion 72.

The decoy 60 is shown in a feeding position in FIG. 6 wherein the head 64 lowered due to the pivoting movement of the pivot member 88 in the direction 142. In this position, there is shown a much greater overlap of the decoy portions 62 and 72.

The decoy 60 is shown again in a feeding position in FIG. 7 with its head lowered even further by further movement of the pivot member 88 in the direction 142. When the decoy portion 62 is lowered to this position, this desirably causes the rear decoy portion 72 to raise. The forward portion 62 is suitably shaped so that, as it moves from its position in FIG. 6 to its position in FIG. 7, the portions along its rear edge 78 push or apply force to the tail portion 72 to raise it, the tail portion 72 pivoting about hinge point 138. This raising movement of a feeding turkey's tail is typical of turkeys and thus provides an even more realistic view of a feeding turkey.

Thus, there is provided in accordance with the present invention a decoy which allows more realistic turkey or other wild game movements for increased hunter success and which is also provided to be rugged, sturdy, and reliable.

It should be understood that, while the present invention has been described in detail herein, the invention can be embodied otherwise without departing from the principles thereof. For example, a decoy may contain more than two portions and/or two or more pivot or hinge members run by the same motor or by individual motors. Such other embodiments are meant to come within the scope of the present invention as defined by the appended claims.

What is claimed is:

1. A decoy comprising at least a head portion and a tail portion which are shaped to together depict an animal, wherein each of said head and tail portions has a shape defining a hollow interior, and one of said head and tail portions is partially received movably within the hollow interior of an other of said head and tail portions to thereby allow relative movement between said head and tail portions, a longitudinal stand adapted for supporting the decoy from the ground, and a member pivotally attached to said stand for movement up and down about a pivot axis which is generally horizontal when said stand extends vertically from the ground to support the decoy, wherein said member is attached to an upper part of said head portion to effect movements thereof as said member is pivoted relative to said stand, said head portion having an upper rear edge portion, said tail portion having an upper forward edge portion, and a hinge extending over a distance along and between said upper rear edge portion and said upper forward edge portion and connecting said upper rear edge portion to said upper forward edge portion such that said tail portion hangs from said hinge and is freely swingable for relative movement of said one portion inwardly and outwardly of the hollow interior of said other portion as said member is pivoted.

2. A decoy according to claim 1 wherein said head and tail portions are shaped to together depict a feeding turkey.

3. A decoy according to claim 1 further comprising means for electronically remotely controlling pivoting movement of said member.

4. A decoy according to claim 1 wherein said stand comprises a lower portion and further comprises an upper portion to which said member is pivotally attached, said upper portion being pivotally connected adjustably to said lower portion.

5. A decoy according to claim 1 wherein the animal is a fowl.

6. A decoy according to claim 1 wherein said hinge comprises a piece of tape applied to both said head and tail portions at least partially along said upper edge portions.

7. A decoy according to claim 1 wherein said head portion is shaped and adapted relative to said tail portion so that, when said head portion approaches a low position during downward movement, said head portion effects an upward movement of said tail portion.

8. A decoy according to claim 1 wherein at least one of said head and tail portions is formed of a sheet material.

9. A decoy according to claim 1 wherein both of said head and tail portions are formed of a sheet material.

10. A decoy comprising at least a head portion and a tail portion which are shaped to together depict an animal, wherein said head portion is formed of a sheet material defining a hollow interior which has an opening defining an edge which includes an upper rear edge portion and wherein said tail portion is formed of a sheet material defining a hollow interior which has an opening defining an edge which includes an upper forward edge portion, and one of said head and tail portions is partially received movably within the hollow interior of an other of said head and tail portions to thereby allow relative movement between said head and tail portions, a hinge extending over a distance along and between said upper rear edge portion and said upper forward edge portion and connecting said upper rear edge portion to said upper forward edge portion such that said tail portion hangs from said hinge and is freely swingable for relative movement of said one of said head and tail portions inwardly and outwardly of the hollow interior of said other of said head and tail portions, a longitudinal stand adapted for supporting the decoy from the ground, said stand extending upwardly within the hollow interior of said one of said head and tail portions, said head and tail portions have cut-outs to allow movement thereof without interference with said stand, a member pivotally attached to said stand for movement up and down about a pivot axis which is generally horizontal when said stand extends vertically from the ground to support the decoy, and said member being further characterized by being connected to an upper part of said head portion and adjacent said upper rear edge portion to effect relative movement between said head and tail portions by pivoting movement of said member.

11. A decoy according to claim 10 wherein said head portion is shaped and adapted relative to said tail portion so that, when said head portion approaches a low position during downward movement, said head portion effects an upward movement of said tail portion.

12. A decoy according to claim 10 further comprising means for electronically remotely controlling pivoting movement of said member.

13. A decoy according to claim 10 wherein said stand comprises a lower portion and further comprises an upper portion to which said member is pivotally attached, said upper portion being pivotally connected adjustably to said lower portion.

14. A decoy according to claim 10 wherein said hinge comprises a piece of tape applied to both said head and tail portions at least partially along said upper edge portions.

15. A decoy comprising at least a head portion and a tail portion which are shaped to together depict an animal, wherein each of said head and tail portions has a shape defining a hollow interior, and one of said head and tail portions is partially received movably within the hollow interior of an other of said head and tail portions in a manner to allow relative movement between said head and tail portions, a longitudinal stand adapted for supporting the decoy from the ground, and a member pivotally attached to said stand for movement up and down about a pivot axis which is generally horizontal when said stand extends vertically from the ground to support the decoy, wherein said member is attached to an upper part of said head portion to effect movements thereof as said member is pivoted relative to slid stand, said head portion having an upper rear edge portion, said tail portion having an upper forward edge portion, and a hinge connecting said head and tail portions and comprising a piece of tape applied to both said head and tail portions at least partially along both said upper rear edge portion and said upper forward edge portion such that said tail portion hangs from said hinge and is freely swingable for relative movement of said one portion inwardly and outwardly of the hollow interior of said other portion as said member is pivoted.

16. A decoy according to claim 15 further comprising means for electronically remotely controlling pivoting movement of said member.

17. A decoy according to claim 15 wherein said stand comprises a lower portion and further comprises an upper portion to which said member is pivotally attached, said upper portion being pivotally connected adjustably to said lower portion.

18. A decoy according to claim 15 wherein the animal is a fowl.

19. A decoy according to claim 15 wherein said head portion is shaped and adapted relative to said tail portion so that, when said head portion approaches a low position during downward movement, said head portion effects an upward movement of said tail portion.

20. A decoy according to claim 15 wherein said head and tail portions are shaped to together depict a feeding turkey.

* * * * *

UNITED STATES PATENT AND TRADEMARK OFFICE
CERTIFICATE OF CORRECTION

PATENT NO. : 7,287,352 B1 Page 1 of 1
APPLICATION NO. : 10/948119
DATED : October 30, 2007
INVENTOR(S) : Richard C. Kirby It is certified that error appears in the above-identified patent and that said Letters Patent is hereby corrected as shown below:

Column 7,
Line 26, "slid" should be --said--.

Signed and Sealed this

Twenty-ninth Day of April, 2008

JON W. DUDAS
*Director of the United States Patent and Trademark Office*